United States Patent [19]

Kosmoski

[11] 4,441,842

[45] Apr. 10, 1984

[54] FOOT ACTUATED LATCH

[75] Inventor: Jeffrey P. Kosmoski, Long Beach, Calif.

[73] Assignee: McDonnell Douglas Corporation, Long Beach, Calif.

[21] Appl. No.: 318,474

[22] Filed: Nov. 5, 1981

[51] Int. Cl.³ .......................... B60P 1/64; B60P 7/13; B61D 45/00

[52] U.S. Cl. ........................................ 410/81; 410/68; 410/76

[58] Field of Search .................. 410/69, 70, 71, 75, 410/76, 77, 80, 81, 84, 94, 79, 68

[56] References Cited

U.S. PATENT DOCUMENTS

| | | | |
|---|---|---|---|
| 3,107,634 | 10/1963 | Gutridge | 410/81 |
| 3,210,038 | 10/1965 | Bader et al. | 410/77 |
| 3,282,550 | 11/1966 | Warren | 410/77 |
| 3,465,998 | 9/1969 | Ginn | 410/77 |
| 3,493,210 | 2/1970 | Brenner | 410/94 |
| 3,641,940 | 2/1972 | Evans | 410/79 |
| 3,698,679 | 10/1972 | Lang et al. | 410/69 |
| 3,759,476 | 9/1973 | Goodwin | 410/69 |
| 3,927,622 | 12/1975 | Voigt | 410/79 |
| 3,986,460 | 10/1976 | Voigt et al. | 410/69 |
| 4,134,345 | 1/1979 | Baldwin et al. | 40/70 |
| 4,352,517 | 10/1982 | Bertolini | 410/81 X |
| 4,375,932 | 3/1983 | Alberti | 410/94 X |

FOREIGN PATENT DOCUMENTS 1481449 7/1977 United Kingdom .................. 410/69

*Primary Examiner*—Howard Beltran
*Attorney, Agent, or Firm*—John P. Scholl; George W. Finch; Donald L. Royer

[57] ABSTRACT

A foot actuated latch for use in an aircraft cargo bay to provide vertical and longitudinal restraint of a cargo container. The latch having a lineal engaging and disengaging action which resists lineal forces parallel to latch movement tending to disengage that latch pawl from the container. The actuation of the latch for engagement and disengagement accomplished by a downward movement of the latch levers.

5 Claims, 3 Drawing Figures bolt 26 to a position substantially parallel to the cargo floor as shown in FIG. 2. This clockwise rotation is limited by stop 28 coming in contact with base 14. Pin 22 moves in slotted cam 24 from the position of FIG. 3 to that of FIG. 2 causing tongue 16 to move lineally to the right thru passageway 23 from the position of FIG. 3 to the position of FIG. 2 and disengage cargo container 12. When the downward force is applied to release lever 20, due to the curvature of slotted cam 22, pin 22 can move freely within the cam and tongue 16 can move lineally within base 14. As tongue 16 moves to the right from the position in FIG. 3 to the position in FIG. 2, it overrides finger 30 on release lever 18. Eventually finger 30 engages notch 32 of tongue 16 holding tongue 16 in the position of FIG. 2. Coil springs 34 and 36 impart a counterclockwise bias to lock lever 18 holding it substantially parallel to the cargo floor with finger 30 in notch 32. This engagement of finger 30 in notch 32 is assured by the coil spring bias until lock lever 18 is again depressed downward by the operators foot from the near horizontal position for release of tongue 16 for engagement with another cargo container.

While certain exemplary embodiments of this invention have been described above and shown in the accompanying drawings, it is to be understood that such embodiments are merely illustrative of, and not restrictive on, the broad invention to the specific desire to be limited in my invention to the specific constructions or arrangements shown and described, since various other obvious modifications may occur to persons having ordinary skill in the art.

What is claimed is:

1. A foot actuated latch for use in securing a container in position on the cargo floor of an aircraft comprising:
    a base member including:
        a slot;
    a tongue slidably positioned in said slot, said tongue having;
        a first end adapted to engage a container,
        an opposite second end;
        an abutment surface therebetween;
        an extended container engaging position; and
        a retracted container releasing position;
    a lock lever having:
        a first end hingedly connected to said base member;
        an abutment finger;
        lock lever bias means acting to urge said abutment finger into engagement with said tongue abutment surface to maintain said tongue in its retracted container release position; and
        a second end adapted for foot actuation against said lock lever bias means to disengage said abutment finger from said tongue abutment surface; and
    a release lever having:
        a first end hingedly connected to said base member;
        means connecting said release lever to said tongue;
        release lever bias means acting to urge said release lever to move said tongue within said slot to its extended container engaging position; and
        a second end adapted for foot actuation against said release lever bias means to move said tongue to its retracted container release position.

2. The foot actuated latch of claim 1 wherein the means connecting the release lever to said tongue is a pin located in tongue which engages a curved sloted cam in the release lever.

3. The foot actuated latch of claim 2 wherein the lock lever and release lever are mounted for rotation on a hinge pin located in the base member.

4. The foot actuated latch of claim 3 wherein the lock lever bias means is a coil spring mounted surrounding the hinge pin and engaging the base and the lock lever.

5. The foot actuated latch of claim 4 wherein the release lever bias means is a coil spring mounted surrounding the hinge pin and engaging the base and the release lever.

* * * * *

FOOT ACTUATED LATCH

BACKGROUND OF THE PRESENT INVENTION

New large wide-body freighter aircraft have the capability of carrying a variety of containers in the cargo bay. Due to the size and number of the containers in these freighter aircraft there may be a substantial number of latches to restrain the cargo containers. Prior art latches usually require some hand operation or upward movement of either latching or release mechanisms, thus requiring stooping or bending of the operator (load master).

Some of the containers vary in length, for example the ASA 832, which may be ten or twenty feet in length. Many of these variable sized containers can only be restrained on the two sides. Some cargo aircraft use guide rails as means to provide lateral restraint of the cargo containers. Prior art latch restraints usually rotated into engagement with the containers thereby limiting their usefulness. Due to the configuration of new containers it is desirable that the latch pawl (tongue) have a lineal engaging motion, as opposed to a rotary motion available on prior art latches shown in U.S. Pat. No. 4,134,345.

For simplicity and to take advantage of the lateral restraint provided by the guide rail, it is desirable that a latch be of configuration such that it maybe mounted on the guide rail to provide intimate contact with the cargo container.

SUMMARY OF THE PRESENT INVENTION

To overcome the deficiencies of the prior art cargo latches, and provide for increased efficiency and effectiveness, the inventive latch may be attached to the longitudinal rail which provides lateral restraint of the cargo container. The inventive latch utilizes a precise lineal movement of the latch pawl or tongue to engage the cargo container and due to combination of release lever and slotted curved cam the tongue resists lineal forces along the pawl tending to disengage the pawl from the cargo container. The latch provides longitudinal as well as vertical restraint to the cargo container. Finally, the inventive latch is constructed so that it may be latched or released by a positive downward foot movement on the mechanism.

DETAILED DESCRIPTION OF THE PREFERRED EMBODIMENT

Figure 1:
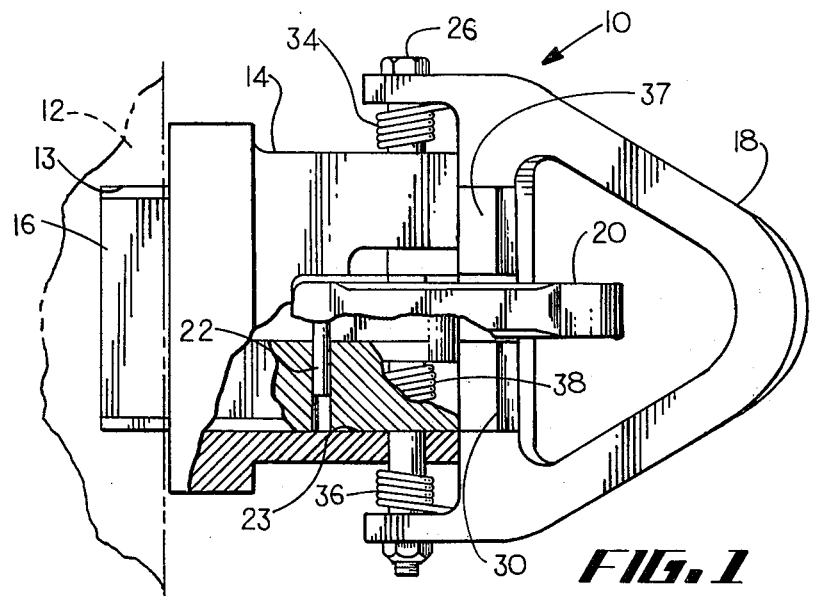
FIG. 1 is a plan view of the inventive latch engaging a cut out in a cargo container.
Figure 2:
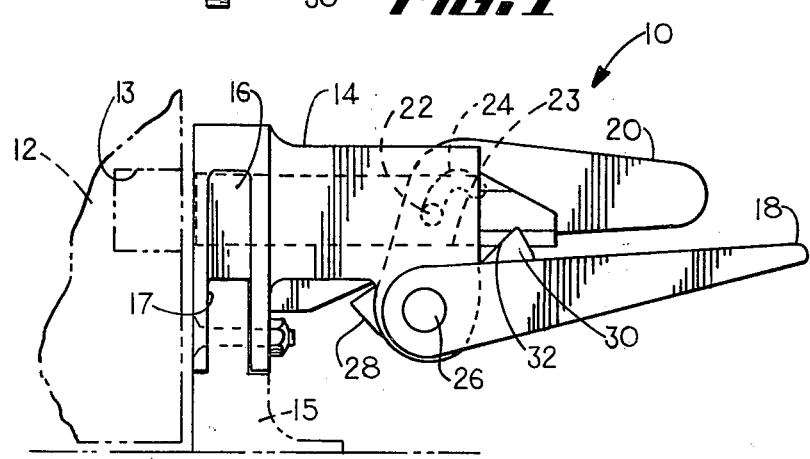
FIG. 2 is a side elevation of the latch in FIG. 1 in a retracted (release) position.
Figure 3:
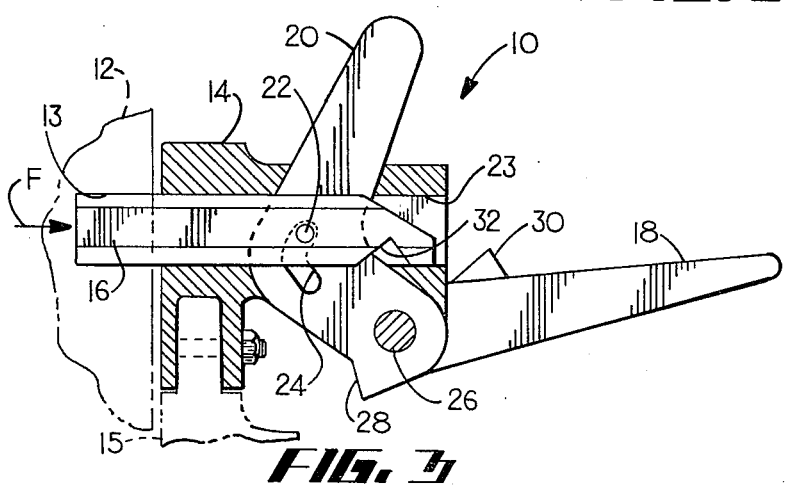
FIG. 3 is a side elevation of the inventive latch of FIGS. 1 and 2 in an extended or restraining position.

The inventive foot actuated latch 10 is shown in FIGS. 1, 2 and 3 adjacent a cargo container 12. The latch has a base 14 (housing) with a channel 17 for mounting on a guide rail 15 by bolts or similar means. A tongue or pawl 16 passes thru the base 14 to engage a cavity 13 in the cargo container 12 (FIGS. 1 and 3). A lock lever 18 secures pawl 16 in a retracted position of FIG. 2. When lock lever 18 is disengaged from tongue 16, tongue 16 moves thru passageway slot 23 into engagement with cavity 13 in container 12. A pin 22 rides in a curved slotted cam 24 located in release lever 20 and provides the connection between release lever 20 and tongue 16. Lock lever 18 and release lever 20 are mounted for rotation on bolt 26 located in base 14. Release lever 20 has a stop 28 which engages base 14 and limits the clockwise rotation of release lever 20. Lock lever 18 has an abutment finger 30 which engages notch (abutment surface) 32 in tongue 16. Coil springs 34 and 36 are mounted surrounding bolt 26 and engage base 14 and engage and bias lock lever 18 in a counterclockwise direction. The counterclockwise rotation of lock lever 18 is limited by bar 37 of lock lever 18 engaging the base 14 or finger 30 on lock lever 18 engaging tongue 16. Coil spring 38 and a similar coil spring 40 (not shown) engage base 14 and engage and bias release lever 20 in a counterclockwise direction around bolt 26. The counterclockwise rotation of release lever 20 is limited by the travel of pin 22 in curved slotted cam 24 of tongue 16. The interaction of tongue 16 on pin 22 in the curved slotted cam in release lever 20 resists a force F (FIG. 3) tending to push tongue 16 out of engagement with cargo container 16. When force F is applied to tongue 16, as shown in FIG. 3, due to the curvature of slotted cam 24, pin 22 is captured by the shape of the slotted cam in release lever 20 and tends to induce arcuate clockwise rotation of pin 26 about bolt 26 and force tongue 16 in an upward direction against the top of the passageway 23 in base 14 as opposed to forcing tongue 16 lineally thru passageway 23 along its normal tract. This upward rotative force tends to lock tongue 16 in position in base 14 and resist withdrawl of tongue 16 from the cavity 13 in base 12.

When notch 32 in tongue 16 is released by finger 30 on lock lever 18, tongue 16 is free to slide. Release lever 20 can then rotate in a clockwise direction due to the bias of coil springs 38 and 40. The reaction of slot 24 in lever 20 on pin 22 drives pawl 16 lineally thru passageway 23 in base 14 from the position shown in FIG. 2 to that of FIG. 3.

In operation the inventive foot latch 10 is placed in the retract position of FIG. 2 and a cargo container 12 is moved longitudinally along laterally supporting guide rail 15 until it is in the desired longitudinal position. The operator then steps on the lock lever 18 which is orientated substantially parallel to the cargo floor and rotates lock lever 18 downward around bolt 26 in a clockwise direction. Finger 30 on lock lever 18 is disengaged from notch 32 releasing tongue 16. Spring bias from coil springs 38 and 40 on release lever 20 move release lever 20 and pin 22 to the left from the position of FIG. 2 to that of FIG. 3. At the same time pin 22 moves in slotted cam 24 resulting in movement of tongue 16 lineally thru passageway 23 from the position of FIG. 2 to the left to the position of FIG. 3. With the movement of tongue 16 to the left, release lever 20 swings from a substantially horizontal position parallel to the cargo floor in FIG. 2 to the substantially vertical position of FIG. 3. As indicated, tongue 16 moves into engagement with the cavity 13 in cargo container 12 and holds cargo container 12 against vertical and longitudinal movement. If a force F, as indicated in FIG. 3, is applied lineally to tongue 16, the interaction of pin 22 in slotted cam 24 jams tongue 16 in the engaged/lock position and tongue 16 resists removal from cavity 13.

Upon completion of the flight and in anticipation of unloading, the operator moves to a position adjacent the foot operated latch and steps on the near vertical release lever 20 as shown in FIG. 3 rotating it clockwise about